United States Patent [19]

Blaner et al.

[11] Patent Number: 5,003,462
[45] Date of Patent: Mar. 26, 1991

[54] APPARATUS AND METHOD FOR IMPLEMENTING PRECISE INTERRUPTS ON A PIPELINED PROCESSOR WITH MULTIPLE FUNCTIONAL UNITS WITH SEPARATE ADDRESS TRANSLATION INTERRUPT MEANS

[75] Inventors: Bartholomew Blaner, Newark Valley; Agnes Y. Ngai, Endwell, both of N.Y.

[73] Assignee: International Business Machines Corporation, Armonk, N.Y.

[21] Appl. No.: 200,688

[22] Filed: May 31, 1988

[51] Int. Cl.⁵ .......................... G06F 9/38; G06F 12/10
[52] U.S. Cl. ................................ 364/200; 364/256.4; 364/241.2
[58] Field of Search ... 364/200 MS File, 900 MS File

[56] References Cited

U.S. PATENT DOCUMENTS

| | | | |
|---|---|---|---|
| 3,988,719 | 10/1976 | Whitby et al. | |
| 4,027,289 | 5/1977 | Toman | |
| 4,037,215 | 7/1977 | Birney et al. | 364/200 |
| 4,057,785 | 11/1977 | Furniss et al. | |
| 4,601,008 | 7/1986 | Kato | 364/900 |
| 4,703,422 | 10/1987 | Kinoshita et al. | 364/200 |

OTHER PUBLICATIONS

IBM Technical Disclosure Bulletin—vol. 28, No. 11—Apr. 1986, pp. 4873–4875.
Implementation of Precise Interrupts in Pipelined Processors, James E. Smith—pp. 36–44.
The IBM 3090 System: An Overview-Tucker-vol. 25, No. 1, 1986.
The IBM System/360 Model 91: Machine Philosophy and Instruction-Handling, D. Anderson et al.—Jan. 1967.

*Primary Examiner*—Lawrence E. Anderson
*Attorney, Agent, or Firm*—Karl F. Milde, Jr.

[57] ABSTRACT

An apparatus and method are disclosed for implementing the system architectural requirement of precise interrupt reporting in a pipelined processor with multiple functional units. Since the expense of an interrupt pipeline is warranted only for those interrupts that occur frequently—specifically, those arising from virtual memory management—the apparatus utilizes an interrupt pipeline for frequently occurring interrupts, and a slower, but much less costly, software-based system for precisely reporting the remaining interrupts. The software-based system is facilitated by an instruction numbering and tracing scheme, whereby pertinent information concerning executed instructions is recorded as the instructions pass through the processor pipeline and potentially to other functional units. A software interrupt handler may use this information to isolate and precisely report an interrupt.

13 Claims, 4 Drawing Sheets

|  | | CYCLE | | | | | | | | |
|---|---|---|---|---|---|---|---|---|---|---|
|  | | 1 | 2 | 3 | 4 | 5 | 6 | 7 | 8 | 9 |
| INSTRUCTION | a | I | R | A | D | F | E | W | | |
|  | b | | I | R | A | D | F | E | W | |
|  | c | | | I | R | A | D | F | E | W |
|  | d | | | | — | — | — | — | — | — |

|  | | CYCLE | | | | | | | |
|---|---|---|---|---|---|---|---|---|---|
|  | | 1 | 2 | 3 | 4 | 5 | 6 | 7 | 8 |
| INSTRUCTION | a | I | R | A | D | F | E | W | |
|  | b | | I | R | A | U | U | U | W |
|  | c | | | I | R | — | — | — | — |
|  | d | | | | — | — | — | — | — |

APPARATUS AND METHOD FOR IMPLEMENTING PRECISE INTERRUPTS ON A PIPELINED PROCESSOR WITH MULTIPLE FUNCTIONAL UNITS WITH SEPARATE ADDRESS TRANSLATION INTERRUPT MEANS

BACKGROUND OF THE INVENTION

The present invention relates generally to the instruction processing unit or instruction fetching and execution portion of a digital computer system. More particularly, the invention relates to an apparatus and method for handling interrupts in a so-called "pipelined" instruction processor.

Computer architectures generally require most interruptions to the stream of instruction execution to be associated with a particular instruction. The degree to which this requirement is fulfilled is called "precision" i.e., an interrupting condition "i" is precise if it can be positively associated with the execution of instruction "n".

In a non-pipelined processor—that is, a processor where one instruction is executed in its entirety before another is started - precision in interrupt reporting is readily achieved since at any given time there is only one instruction with which an interrupt could be associated. However, reporting interrupts precisely in a pipelined processor is much more difficult since many instructions may be in various stages of execution simultaneously. Thus, upon the occurrence of an interrupting condition i, it may not be clear with which of the currently executing instructions - n, n+1, n+2, and so on—to associate with the interrupt. Furthermore, multiple interrupts may occur substantially simultaneously, creating the question of which of these to report and handle first. Often, the system architecture dictates that only the oldest and highest priority interrupt may be reported.

The difficulty of precisely reporting interrupts in a pipelined processor has been faced by designers in the past. Some, in fact, have circumvented the problem by deviating from the system architecture and reporting interrupts imprecisely. See, for example, D. W. Anderson, et al., "The IBM System/360 Model 91: Machine Philosophy and Instruction-Handling,", *IBM Journal*, January, 1967. Thus, in a stream of executing instructions n, n+1, n+2, and so on, that is interrupted by condition i, the interrupt cannot be accurately associated with any of the currently executing instructions.

In a computing environment where interrupts are quite infrequent, it is perhaps permissible to report interrupts imprecisely. However, with the advent of virtual memory, precise interrupt reporting and handling has become mandatory because interrupts caused by the virtual memory management process must be associated with the instruction that caused them. In particular, "address translation lookaside buffer" (or "TLB") miss interrupts are caused when the translation lookaside buffer does not produce the absolute memory address associated with the virtual memory address contained in an instruction. Such "TLB misses"-meaning, the absolute address is missing from the translation lookaside buffer—occur at a comparatively high frequency and are often resolved by performing an address translation and then re-executing part or all of the instruction that caused the TLB miss. In order to re-execute the instruction, it is necessary to determine exactly (precisely) which instruction caused the TLB miss. Also, because they occur more frequently than other interrupts, the speed with which TLB misses are reported and handled can impact processor performance significantly.

The problem of precise interrupt reporting is further exacerbated when additional functional units extend the main instruction-fetch and execution (I/E) unit pipeline. Such functional units might include an instruction and data storage unit, a floating-point execution unit, a vector execution unit, and so on, and are driven by the same instruction stream as the I/E unit. In particular, the I/E unit fetches instructions from the storage unit and forwards instructions or commands to the functional units for execution as required while continuing to execute additional instructions in the stream for as long as possible, perhaps until some result to be produced by a functional unit is required for further computation. Thus it can be seen that a large number of instructions may be in various phases of execution concurrently across the system and, consequently, interrupts may occur simultaneously in any or all of the units, making precise interrupt reporting a formidable problem indeed.

A number of schemes for precisely reporting interrupts in a pipelined processing system with multiple functional units have been implemented or proposed. The IBM 3090 TM vector facility uses an interrupt pipeline with a complex hardware structure that is difficult to design and control. See S. G. Tucker, "The IBM 3090 System: An Overview,", *IBM System Journal*, Vol. 25, No. 1, 1986. Smith and Pleszkun propose other elaborate hardware structures—reorder buffers, history buffers, future files, etc. - which have yet to be proven viable. See J. E. Smith and A. R. Pleszkun "Implementation of Precise Interrupts in Pipelined Processors,". *Proc. 12th Annual International Symposium on Computer Architecture*, pp. 36–44, June 1985.

SUMMARY OF THE INVENTION

It is the principal object of the present invention to provide a system (apparatus and method) for precisely reporting interrupts in a pipelined instruction processor which requires a minimum of additional hardware while permitting virtual memory mamagement interrupts, such as TLB miss interrupts, to be handled rapidly.

This object, as well as other objects which will become apparent from the discussion that follows, are achieved, according to the present invention, by providing separate hardware structure for precisely and rapidly handling frequently occurring interrupts, such as TLB miss interrupts, and a slower, but much less costly, software based system for precisely reporting and handling the remaining interrupts.

In this way, interrupts that arise from virtual memory management can be rapidly handled so that the instructions with which they are associated can be re-executed and the machine can continue its operation with only a brief pause. Other types of interrupts, which normally require halting the instruction processing altogether, are handled at a much slower pace by a software based interrupt routine.

The general scheme according to the invention outlined above is implemented to provide precise interrupt handling with a pipelined instruction processor in the following (1) A separate, interrupt pipeline, parallel to the instruction pipeline is provided for TLB miss interrupts.

Such interrupts, be they instructionfetch TLB misses or storage-operand TLB misses ("data" TLB misses), are stepped through the interrupt pipeline in synchronism with their associated instructions, as the latter are stepped through the instruction pipeline. The instruction pipeline can therefore be "drained" after issuance of a TLB miss interrupt, by executing all instructions preceding the instruction which caused TLB miss interrupt, before the TLB miss interrupt itself is reported and handled.

(2) Precision in reporting other interrupts which are handled by software is facilitated by an instruction numbering and tracing scheme whereby pertinent information about the instructions being executed is recorded in a "trace array" as the instructions enter the processor pipeline. In particular, a number is assigned to each instruction received by the instruction processor and each instruction, so received, is stored in the trace array together with its assigned number. The interrupt handler operates to determine the assigned number of each instruction in the instruction processor which caused an interrupt (other than a TLB miss interrupt); to select that instruction, among those which caused interrupts, having the earliest assigned number; and to address and fetch the selected instruction from the trace array for subsequent interrupt handling. The software which carries out these functions may run on the same instruction processing unit which forms the instruction pipeline or a separate instruction processing unit, separate and apart from the pipelined processing unit.

If the pipelined processor includes a number of functional units for executing different tasks, the tracing number assigned to each instruction is broadcast to either the instruction pipeline or the functional unit which is to execute that particular instruction. This number remains with the executing hardware until the instruction is fully executed so that, if an interrupt occurs, the interrupt handling software can determine, by polling the functional units, the assigned number of the instruction which caused the interrupt.

For a full understanding of the present invention, reference should now be made to the following detailed description of the preferred embodiments of the invention and to the accompanying drawings.

DESCRIPTION OF THE PREFERRED EMBODIMENTS

The preferred embodiments of the present invention will now be described with reference to FIGS. 1-6 of the drawings.

Figures 1, 2, 3:
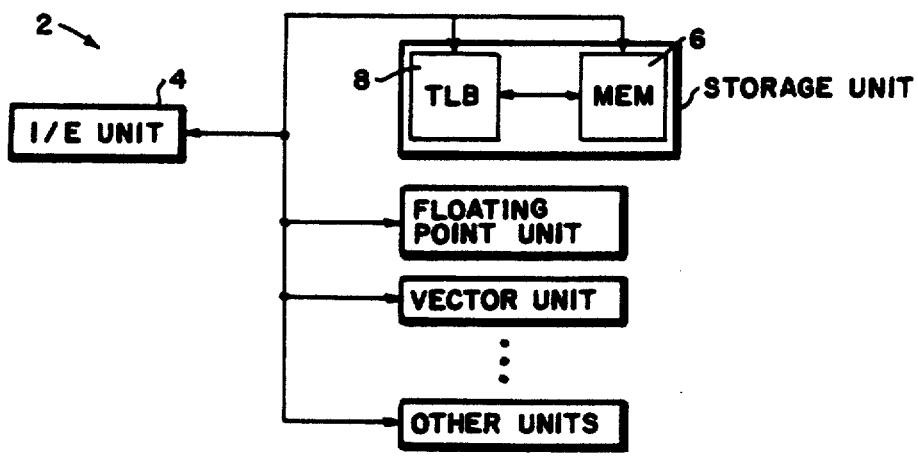
FIG. 1 is a block diagram of certain components of a digital computer system which are relevant to an understanding of the present invention.
FIG. 2 is a cycle diagram illustrating the operation of a pipelined processor.
FIG. 3 is a cycle diagram of the type represented in FIG. 2, which sets forth an example of the need for instruction tracing for precise interrupt handling in a pipelined processor.

FIG. 1 generally shows the computer system environment to which the present invention relates. The system comprises an instruction processing unit (IPU) 2 for fetching from memory and executing successive program instructions.

This IPU comprises a pipelined instruction fetch/execution (I/E) unit 4 and a number of functional units, such as a storage unit, floating point unit, vector unit and so on, each of which is capable of executing specific types of instructions while such instructions are being cycled through successive stages of the I/E unit pipeline.

The storage unit may be viewed as comprising a memory 6 and a translation lookaside buffer 8 which converts virtual memory addresses into absolute memory addresses. The execution unit 4, which is itself capable of executing certain instructions, may be viewed as (and is considered herein as being) another functional unit.

TLB Miss Interrupt Handling: As stated above, TLB miss interrupts for instruction and data fetches occur frequently enough to warrant the construction of a specialized hardware structure for processing them. In the present invention, special pipeline hardware is provided to record and defer processing a TLB miss interrupt until the proper time. If, at that time, the TLB miss is the highest priority interrupt (priority as specified by the system architecture), the TLB miss interrupt is reported and handled.

The general interrupt pipeline control algorithm may be summarized as follows:

(1) Record the TLB miss interrupt in some storage means.

(2) Wait for the I/E and all functional unit pipelines to complete execution of previous instructions (i.e., to drain) and cancel execution of any new instructions. Additional interrupts may surface during this period.

(3) When all pipelines have drained, if the TLB miss is still the highest priority interrupt, it is reported to the TLB miss interrupt handler. Since at this point all previous instructions have completed execution and no new instructions were started after the TLB miss was recorded, the instruction with which to associate the TLB miss is clear.

(4) If the TLB miss is not the highest priority interrupt, then a software interrupt handler, which may use a special instruction trace mechanism to resolve the pending interrupts, is invoked.

This algorithm or method may be applied to any digital computer system having a pipelined instruction processing unit (IPU) that must be made responsive to TLB miss interrupts as well as to interrupts of other types. In the preferred embodiment as well as the best mode for practicing the invention, the algorithm is implemented in the instruction/execution (I/E) unit pipeline disclosed in the commonly assigned U.S. Pat. Application Ser. No. 159,016, of S. L. Gregor filed Feb. 22, 1988, and entitled "Store Queue for a Tightly Coupled Multiple Processor Configuration with Two-Level Cache Buffer Storage", which application is incorporated herein by reference. This pipeline is conveniently described by the following symbols:

I Fetch instruction from storage unit.
R Decode instruction; read general registers.
A Calculate storage operand address; send operation command to functional unit(s), if any.
D Storage unit access, first cycle.
F Storage unit access, second cycle.
E Execution phase.
W Write execution results in the general registers.

Certain pipeline phases may be omitted or have null pipeline phases substituted for them as necessary.

A typical pipeline sequence is illustrated in FIG. 2. Here, instructions, a, b, and c are shown in various phases of execution in the I/E unit pipeline. However, upon fetching the fourth instruction, d, from the storage unit, a TLB miss occurs. Thus, a null cycle, indicated by a dash, is indicated in cycle 4 in lieu of an I, since, because of the TLB miss, there is no instruction to execute. To perform steps 1 and 2 of the above algorithm, the TLB miss is recorded in cycle 4 and pipelined (deferred in step with the I/E unit pipeline) from cycles 4 to 9, until the instruction started just prior to the interrupt, c, completes its execution.

In cycle 9, a decision is made on reporting the TLB miss interrupt. If during the completion of instructions a, b, or c (cycles 4 through 9) either no other additional interrupts occurred or those that occurred were of a priority lower than that of a TLB miss on instruction fetch, then the TLB miss will be reported in cycle 9. If, on the other hand, an interrupt of higher priority occurred in cycles 4 through 9, the software interrupt handler is invoked to handle this interrupt. Since only the TLB miss interrupt is pipelined, all other interrupts must utilize an instruction tracing mechanism to resolve the situation and precisely report this interrupt.

A similar mechanism is used to precisely report TLB miss interrupts for operand data storage references for such TLB misses as may occur in the D phase of the pipeline.

Instruction Tracing: An instruction tracing mechanism according to the invention employs hardware to facilitate the precise reporting of interrupts by a software interrupt handler. This hardware comprises the following elements:

(1) Instruction number assignment and broadcast apparatus; and
(2) Apparatus for tracing addresses and text of executed instructions, and, if desired, other pertinent information, where "text" refers to the instruction itself which would typically consist of an operation code and operand addresses.

A unique number is assigned to each instruction in its R cycle on a modulo n basis, where n is greater than or equal to the number of stages in the I/E unit pipeline plus the number of pipeline stages a functional unit may advance ahead of the I/E unit without the latter stopping to wait for execution results from the functional unit. In the present embodiment a value of n=8 was chosen since this number can conveniently be represented by three bits.

In the A cycle of an instruction, the number for that instruction is broadcast to each functional unit, together with the operation command for the instruction; e.g. "fetch data" to the storage unit, or "compute square root" to the floating-point execution unit. Upon receiving the operation command and instruction number, the functional unit records this information, provided the operation command pertains to that functional unit. Subsequently, it is the responsibility of the functional unit to maintain the association between a given operation command and its instruction number throughout the execution of the operation which may consist of an indefinite number of phases. When the execution of the operation has been completed, if no interrupts occurred during the execution, the number is discarded; otherwise, the number is retained along with any relevant interrupt information for later use by the software interrupt handler. Thus the association of an interrupt with a particular instruction is always known.

Concurrently with instruction number broadcast, the number, address, and text for a given instruction is recorded in a storage device referred to as the "trace array". Each number, address, text three-tuple forms a single entry in the trace array and the array must have at least n entries. The instruction most recently written into the trace array is called the current instruction. A separate storage device records the number of the current instruction, which is incremented by one modulo n in the R cycle of each new instruction.

Given these hardware structures, it is a simple matter to provide a mechanism for accessing the instruction numbers recorded in the various functional units as well as the information stored in the instruction trace array and the current instruction number, so that the precise reporting of an interrupt proceeds as follows:

(1) For every interrupt recorded, the corresponding functional unit is queried for the number of the instruction that caused the interrupt.
(2) For instruction numbers x and y, where x <y modulo n, it follows that the instruction associated with x was executed prior to the instruction associated with y, even though an interrupt associated with instruction y may have occurred earlier than an interrupt associated with instruction x. Precise interrupt reporting requires that an interrupt for instruction x be reported before an interrupt for instruction y. In the event of multiple interrupts for instruction x, some prioritization mechanism, perhaps as dictated by the system architecture, may be used to decide the sequence in which these interrupts are to be reported.

As an example of using the instruction trace method for precisely reporting an interrupt, consider the example shown in FIG. 3. In this example, the "U" pipeline phase has been introduced to identify a pipeline stage executing in some functional unit other than the I/E or storage unit.

In this example, assume that the instructions are numbered a=1, b=2, and c=3. Further, assume that in cycle 4, the I/E unit detects some error in the text of instruction c, commonly called a "specification exception", causing an interrupt and subsequent cancellation of execution of the remainder of instruction c. In the execution phase (E - cycle 6) of instruction a, an arithmetic overflow is detected, causing an interrupt. And in cycle 7, the functional unit executing instruction b detects some exceptional condition, such as a floating-point arithmetic exception, which causes an interrupt. Finally, fetching instruction d causes a TLB miss in cycle 4. Instruction d is not assigned a number, since really no instruction exists to be executed, but it can be viewed as having been assigned the next sequential instruction number.

As with the previous example, the pipeline must be drained before an interrupt reporting decision can be made. Hence, the TLB miss is pipelined to cycle 8 as previously described, and as this pipelining proceeds, the other, previously mentioned interrupts are detected. At cycle 8, since other interrupts have been detected, the TLB miss is not handled and instead the software interrupt handler is invoked.

The software interrupt handler may then poll the functional units for extant interrupts and their associated instruction numbers. The I/E unit would report an arithmetic overflow on instruction number 1, and a specification exception interrupt on instruction number 3, the current instruction. A functional unit, the floating-point arithmetic unit in this case, would report a floating-point arithmetic exception on instruction number 2. The TLB miss is associated with a failed instruction fetch, and logically must be the most recent interrupting circumstance in the scenario.

Then using the rules proscribed above, the software interrupt handler would recognize that because 1 2 or 3 modulo n, the arithmetic overflow is the interrupt that must be reported because it is the oldest of all pending interrupts. Typically, then, the address and text of the interrupting instruction are required to complete the interrupt reporting process. These data may be obtained by accessing the instruction trace array entry assigned to instruction number 1.

Figure 4:
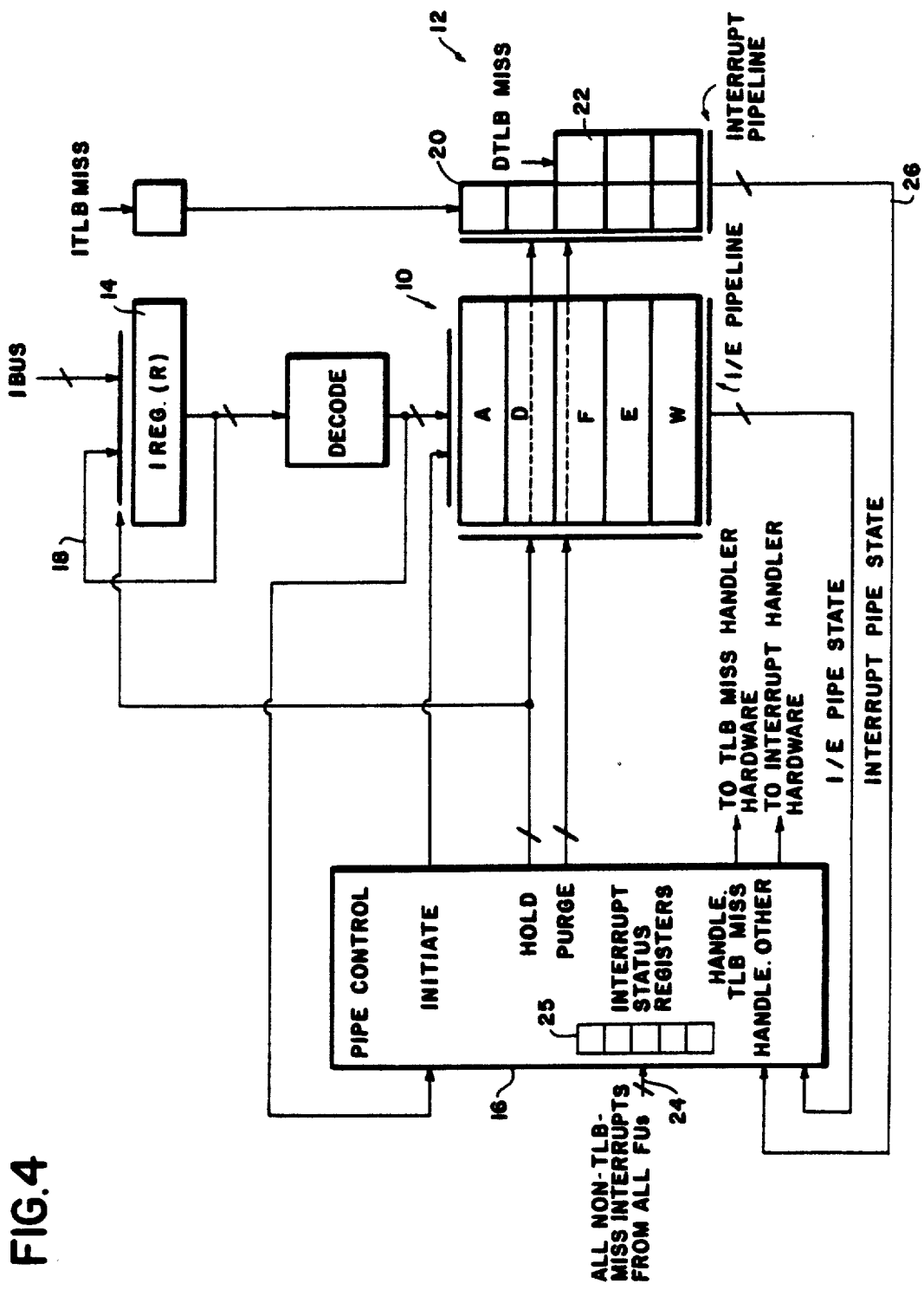
FIG. 4 is a detailed block diagram of the instruction-fetch and execution (I/E) unit pipeline, a TLB miss interrupt pipeline and a pipeline controller, all in accordance with the present invention.

Implementation: FIG. 4 illustrates the I/E and interrupt pipelines 10 and 12, respectively, and their associated control hardware. Using the pipeline terminology defined previously, during the I phase of the pipeline, an instruction is fetched from storage, is supplied to the I/E unit on the IBUS, and is latched in the Instruction Register (IREG) 14. In the R phase, the pipeline control logic 16 determines whether to initiate, i.e., commence execution of, the instruction based on the decoded instruction (i.e., the type of instruction to be executed, the resources it requires, etc.) and the state of the I/E and interrupt pipelines 10 and 12. If the instruction cannot be initiated, the pipeline controller 16 may postpone the instruction by holding it in the IREG 14, via the wrapback path 18, until the necessary resources are available. Furthermore, the pipeline controller 16 can hold or purge (nullify a pending operation) any stage of the I/E pipeline. With these controls, the controller can effect the behavior described previously, namely, to drain the pipeline of any operations already in progress and prevent any new operations from being started once an interrupt has been detected.

The two forms of TLB miss interrupts are pipelined in step with the I/E pipeline. Instruction-fetch TLB misses enter one channel 20 of the pipeline during the instruction fetch (I) phase, while storage-operand TLB misses ("data" TLB misses) enter another channel 22 during the first storage unit access phase (D). All other interrupts from the various functional units enter the pipeline controller 16 directly via lines 24 and are stored in single-bit interrupt status registers 25, one register being associated with each separate functional unit (including the execution (E) unit which is viewed as another functional unit). These stored interrupts are then prioritized by a software interrupt handler routine (described hereinbelow) along with any outstanding TLB miss interrupts output from the interrupt pipeline on lines 26, and the appropriate interrupt handling mechanism (either hardware for TLB miss interrupts or software for all other interrupts) is invoked.

Figure 5:
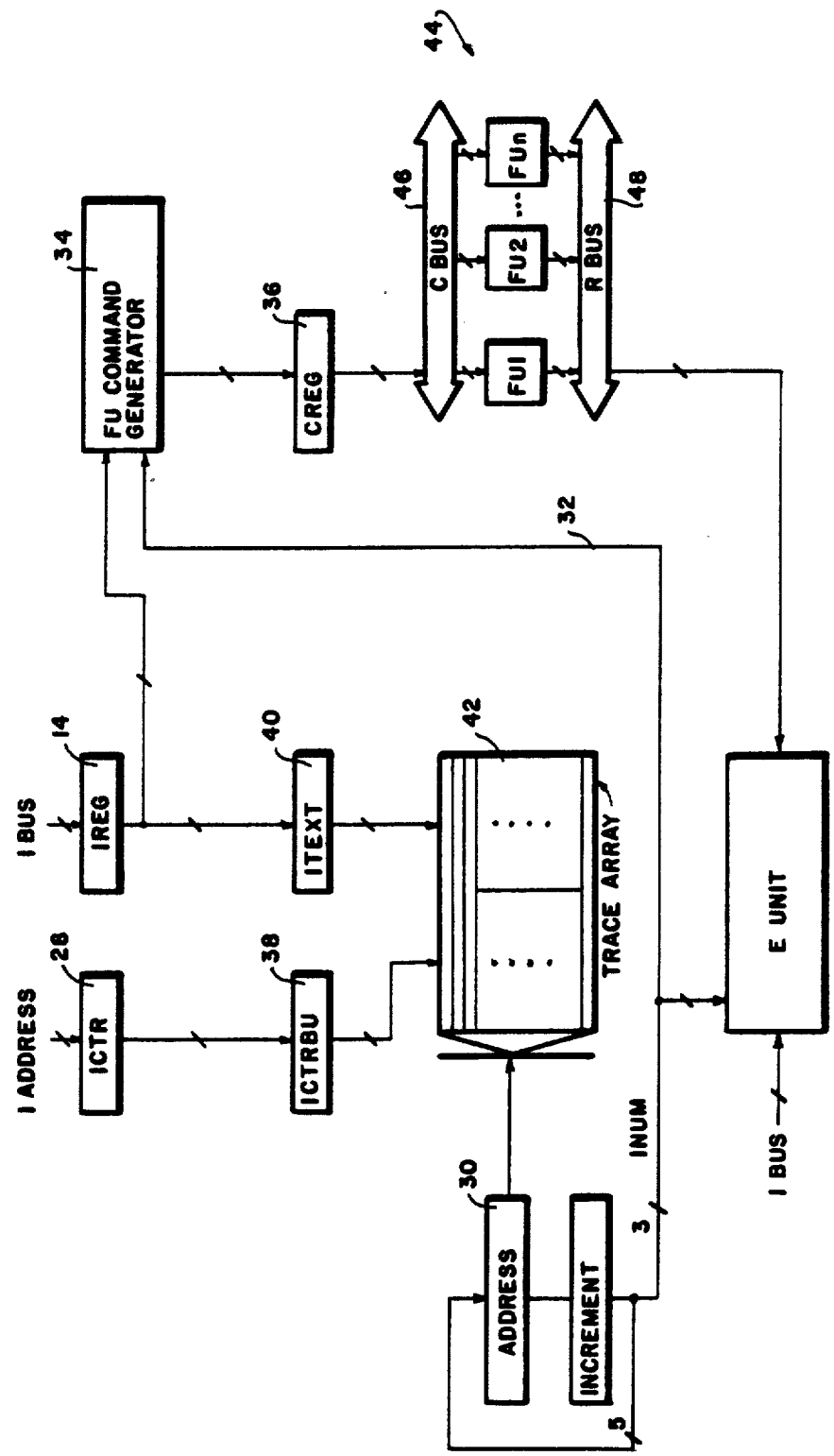
FIG. 5 is a detailed block diagram illustrating the addition of a trace array, in accordance with the present invention, to a pipelined processor which multiple functional units.

FIG. 5 illustrates the instruction tracing hardware. As with FIG. 4, an instruction enters the IREG 14 during the I phase of the pipeline. Concurrently, the storage address of that instruction is loaded into the instruction counter (ICTR) 28. The least-significant three bits of the incremented trace array address register 30 output are used to form the instruction number (INUM). The instruction number is forwarded via lines 32 to the functional unit (FU) command generator 34, which, in the meantime, has decoded the instruction in IREG 14 and has formulated an FU command appropriate to the instruction. This command is merged with the instruction number and loaded into the command register (CREG) 36.

In the next cycle, the A phase, the ICTR 28 and IREG 14 contents are forwarded to the ICTR backup register (ICTRBU) 38 and the instruction text register (ITEXT) 40, respectively. The address register 30 is incremented by one, and the contents of the ICTRBU and ITEXT are loaded into the instruction trace array 42 at the address indicated by the address register 30. Meanwhile, the command and instruction number in the CREG 36 is broadcast to the FUs 44 via the CBUS 46. The FU for which the command is intended will latch the command and instruction number, and the latter will be retained for the duration of the execution of the command. Should the instruction number be required later by the software interrupt handler, it may be obtained from the FU via the result bus (RBUS) 48.

As shown in FIG. 5 the instruction on the IBUS as well as the INUM are also provided to the execution (E) unit 50. As explained above, the E unit is treated in the identical manner to any other functional unit.

In this implementation, the trace array 42 is thirty-two entries deep; thus, the address register 30 is 5 bits wide, and the instruction number may range from 0 to 7. Also note that each register in FIG. 5 is, in fact, part of the I/E pipeline, and therefore receives the hold and purge controls from the I/E pipeline controller 16 described above.

To illustrate the operation of this hardware, consider the following example. Instruction i and its corresponding address a are loaded into the IREG 14 and ICTR 28, respectively. At that point, the address register 30 contains the binary value 10011, and the output of the incrementer is therefore 10100, making the instruction number 100, or 4, in decimal. Instruction i is decoded by the FU command generator 34, and an FU command is formed and merged with the instruction number. At the next clock tick, the IREG and ICTR contents are transferred to the ITEXT 40 and ICTRBU 38, respectively; the FU command and instruction number are loaded into the CREG 36 and broadcast to all the FU's 44; the address register 30 is loaded with binary 10100; and the contents of ITEXT and ICTRBU are written into the trace array 42 at address 10100.

Implicit in FIG. 5 are means for accessing the instruction trace array 42, the address register 30, and the ITEXT and ICTRBU registers 40 and 38 via the software interrupt handler. Given these means, the interrupt handler may use the instruction number stored by an FU to locate an interrupt-causing instruction in the trace array 42.

Figure 6:
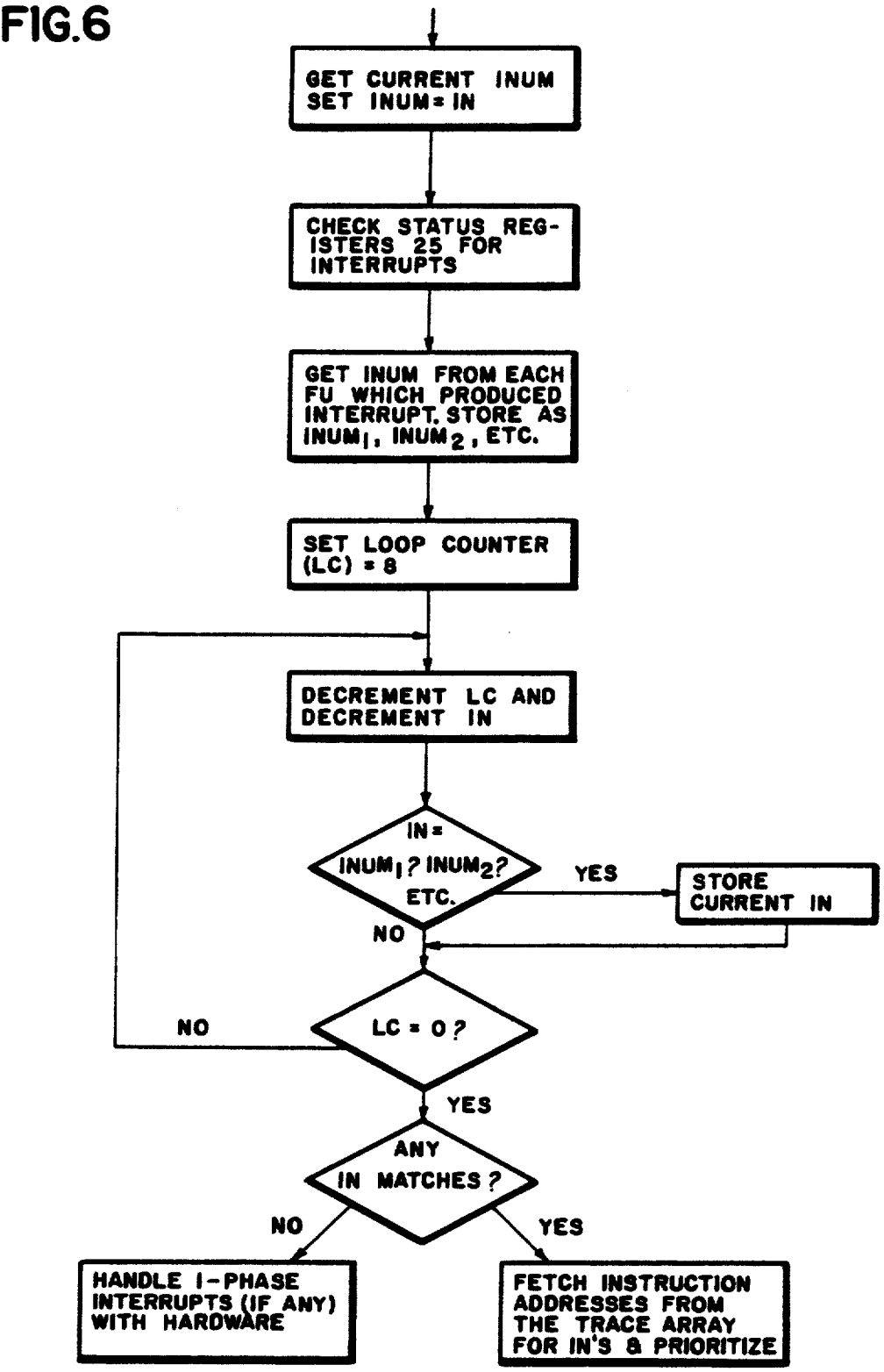
FIG. 6, is a flowchart of a software interrupt handler routine which traces and prioritizes instructions which caused interrupts.

Instruction Tracing Software: FIG. 6 shows, in flow chart form, the preferred embodiment of a software routine for determining the memory addresses of those instructions which caused interrupts when processed by the I/E unit and its other functional units. The program starts by getting the current instruction number, even if there is no "current instruction" due to an I - phase interrupt. This current instruction number, which is a variable IN in the routine, is obtained from the last three address bits in the address counter 30.

Thereafter, the program checks the interrupt status registers 25 to determine whether a status bit, indicating an interrupt, is set for any of the functional units (including the E unit). If a status bit is set in one or more registers, the program gets the instruction number from each functional unit which produced the interrupt. These numbers are stored as variables INUM1, INUM2, etc.

Thereafter, the program enters an eight count loop; that is, it counts backwards from LC=8 to LC=0, each time decrementing the variable IN so that all of the possible instruction numbers are considered. For each decremented value of IN, this variable is compared with the stored numbers INUM1, INUM2, etc. If the variable IN matches any of the variables INUM1, INUM2, etc., this match is recorded and the loop continues.

When the loop is completed, the program determines whether there were any IN matches. If not, control is transferred to a hardware interrupt handler to handle an I-phase interrupt, if any occurred. If any IN matches were found, the program fetches from the trace array the addresses of those instructions designated by the recorded instruction numbers IN. Thereafter, the program prioritizes the interrupts and transfers control to a special purpose software interrupt handler for that interrupt with the highest priority.

Conclusion: A novel technique for precise reporting of interrupts in a pipelined processor with multiple functional units has been described. The technique effectively partitions interrupt reporting according to the anticipated frequency of a given interrupt: the high-frequency interrupt, a TLB miss, is handled directly by hardware; the remaining interrupts, such as arithmetic overflow, which occur at a comparatively lower frequency, are handled by a software interrupt handler which can precisely report interrupts because of the instruction numbering and tracing mechanism. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the claims which follow.

What is claimed is:

1. A digital computer system comprising in combination:
   (a) a memory;
   (b) an instruction processing unit (IPU) for fetching from memory and executing successive program instructions;
   (c) address translation lookaside buffer (TLB) means, coupled to said IPU, for converting a virtual memory address to an absolute memory address, said TLB means having stored therein a translation table of corresponding virtual and absolute memory addresses and being responsive to the receipt of a virtual memory address associated with a given instruction to either return a corresponding absolute memory address, if such address is stored in said translation table, or issue a TLB miss interrupt if such corresponding absolute address is not stored in said translation table;
   (d) means for issuing other interrupts of various types in response to prescribed exception conditions detected during fetching, decoding and execution of said instructions; and
   (e) separate TLB miss interrupt and other interrupt handling means for carrying out a predetermined sequence of operations in response to a respective interrupt, with said TLB miss interrupt handling means being substantially faster in operation than said other interrupt handling means;
   whereby said TLB miss interrupts are handled substantially more rapidly than said other interrupts.

2. The computer system defined in claim 1, wherein said IPU includes:
   (1) an instruction pipeline having a plurality of pipeline stages for receiving and temporarily holding a plurality of successive instructions in sequence in successive ones of said stages while they are in the process of being fetched, decoded and executed; and
   (2) an interrupt pipeline having a plurality of pipeline stages for temporarily holding said TLB miss interrupts in sequence in successive ones of said stages as the instructions preceding the instruction which caused a respective TLB miss interrupt to issue are executed,
   whereby said TLB miss interrupt handling means is operative to process a TLB miss interrupt only after said preceding instructions have been executed.

3. The computer system defined in claim 2 wherein send other interrupt handling means includes a software program.

4. The computer system defined in claim 2, wherein said TLB miss interrupts in said interrupt pipeline are stepped to successive stages in synchronism with their corresponding instructions in said instruction pipeline.

5. The computer system defined in claim 2, wherein said TLB means includes means for issuing instruction-fetch TLB miss interrupts during the instruction fetch phase and data TLB miss interrupts during the first storage unit access phase of said IPU, and wherein said interrupt pipeline has a separate channel for each of said instruction-fetch and said data TLB miss interrupts.

6. The computer system defined in claim 2, further comprising pipeline control means, connected to said instruction pipeline and to said interrupt pipeline, for initiating execution of each instruction in dependence upon the state of said instruction pipeline and said interrupt pipeline.

7. The computer system defined in claim 6, wherein said pipeline control means further includes means for holding an instruction in any stage of said instruction pipeline.

8. The computer system defined in claim 7, wherein said pipeline control means further includes means for purging an instruction from any stage of said instruction pipeline.

9. The computer system defined in claim 2, further comprising instruction tracing means including:
   (1) means for assigning a number to each instruction received by said IPU; and
   (2) trace array means, coupled to said instruction number assigning means, for storing each instruction received by said IPU with its assigned number; and wherein said other interrupt handling means includes:
(1) means for determining the assigned number of each instruction in said IPU which caused one of other interrupts;
(2) means for selecting the instruction in said IPU which caused one of said other interrupts, said instruction having the earliest assigned number;
(3) means for addressing and fetching said selected instruction from said trace array means for subsequent interrupt handling.

10. The computer system defined in claim 9, wherein said other interrupt handling means includes a software program.

11. The computer system defined in claim 9, wherein said IPU further includes a plurality of functional units for executing different tasks in response to commands decoded from the program instructions fetched from memory; and wherein said instruction number assigning means includes means for broadcasting the number assigned to each respective instruction to the instruction pipeline or functional unit which is to execute the command decoded from such instruction.

12. A method for precisely reporting and handling interrupts in a digital computer system comprising a memory; a pipelined instruction processing unit (IPU) for fetching from memory and executing successive instructions; address translation lookaside buffer (TLB) means, coupled to said IPU, for converting a virtual memory address to an absolute memory address, said TLB means having stored therein a translation table of corresponding virtual and absolute memory addresses and being responsive to the receipt of a virtual memory address associated with a given instruction to either return a corresponding absolute memory address if such address is stored in said translation table, or issue a TLB miss interrupt if such corresponding absolute address is not stored in said translation table; means for issuing other interrupts of various types in response to prescribed exception conditions detected during fetching, decoding and execution of said instructions; means for temporarily storing said TLB miss and said other interrupts and for determining priority among the stored interrupts; and separate TLB miss interrupt and other interrupt handling means for carrying out a predetermined sequence of operations in response to a respective interrupt, with said TLB miss interrupt handling means being substantially faster in operation than said other interrupt handling means; said method comprising the steps of:
(a) storing a TLB miss interrupt, upon its occurrence;
(b) completing the execution of only those instructions in said IPU which were fetched prior to the instruction which caused said TLB miss interrupt;
(c) storing all other interrupts which occur as a result of the execution of said instructions in step (b);
(d) determining the priority of all stored interrupts;
(e) if a TLB miss interrupt is the only stored interrupt or has the highest priority, causing said TLB miss interrupt handling means to process said TLB miss interrupt;
(d) if another interrupt has the highest priority, causing said other interrupt handling means to process said other interrupt; whereby said TLB miss interrupts are handled substantially more rapidly than said other interrupts.

13. The method defined in claim 12, further comprising the steps of:
(e) assigning a number to each instruction received by said IPU; and
(f) storing each instruction received by said IPU with its assigned number; and wherein step (d) comprises the steps of:
(1) determining the assigned numbers of instructions in said IPU which caused said other interrupts;
(2) selecting the instruction in said IPU which caused one of said other interrupts, said instruction having the earliest assigned number; and
(3) addressing and fetching said selected instruction from storage for subsequent interrupt handling.

* * * * *